United States Patent
Bae et al.

(10) Patent No.: US 9,857,929 B2
(45) Date of Patent: Jan. 2, 2018

(54) TOUCH PANEL AND METHOD FOR MANUFACTURING THE SAME

(71) Applicant: Samsung Display Co., Ltd., Yongin, Gyeonggi-Do (KR)

(72) Inventors: Joo-Han Bae, Seongnam-si (KR); Sung Ku Kang, Suwon-si (KR); Yun Ha Kim, Cheonan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/924,150

(22) Filed: Oct. 27, 2015

(65) Prior Publication Data

US 2016/0224153 A1    Aug. 4, 2016

(30) Foreign Application Priority Data

Feb. 3, 2015 (KR) .......................... 10-2015-0016955

(51) Int. Cl.
*G06F 3/042*    (2006.01)
*G06F 3/044*    (2006.01)

(52) U.S. Cl.
CPC ........ *G06F 3/044* (2013.01); *B32B 2457/208* (2013.01); *G06F 2203/04103* (2013.01)

(58) Field of Classification Search
CPC ......... G06F 2203/04103; G06F 3/0412; G06F 3/044; B32B 2457/208
See application file for complete search history.

(56) References Cited

U.S. PATENT DOCUMENTS

| | | | |
|---|---|---|---|
| 2008/0157080 A1* | 7/2008 | Gruner | B82Y 10/00 257/59 |
| 2009/0073570 A1* | 3/2009 | Lubart | G02B 5/00 359/641 |
| 2013/0027118 A1* | 1/2013 | Ho | G06F 3/044 327/517 |
| 2014/0111711 A1* | 4/2014 | Iwami | B32B 7/02 349/12 |

FOREIGN PATENT DOCUMENTS

| | | |
|---|---|---|
| JP | 2014-10516 A | 1/2014 |
| KR | 10-2013-0035833 A | 4/2013 |
| KR | 10-2014-0036265 A | 3/2014 |
| KR | 10-2014-0042318 A | 4/2014 |

* cited by examiner

*Primary Examiner* — Insa Sadio
(74) *Attorney, Agent, or Firm* — Knobbe Martens Olson & Bear LLP

(57) ABSTRACT

A touch panel and method for manufacturing the same are disclosed. In one aspect, the touch panel includes a substrate including a touch area, a photosensitive lower layer formed over the substrate and a plurality of touch electrodes and a plurality of connecting lines formed over the photosensitive lower layer positioned in the touch area of the substrate. The touch panel also includes a pad formed over the photosensitive lower layer positioned outside the touch area of the substrate and connected to one end of the connecting line and a photosensitive upper layer positioned over the touch electrodes and the connecting lines.

19 Claims, 8 Drawing Sheets

TOUCH PANEL AND METHOD FOR MANUFACTURING THE SAME

CROSS-REFERENCE TO RELATED APPLICATION

This application claims priority to and the benefit of Korean Patent Application No. 10-2015-0016955 filed in the Korean Intellectual Property Office on Feb. 3, 2015, the entire contents of which are incorporated herein by reference.

BACKGROUND

Field

The described technology generally relates to a touch panel and method for manufacturing the same.

Description of the Related Technology

Display devices such as a liquid crystal display and an organic light-emitting display, portable transmission devices, other information processing devices, and the like perform functions by using various input devices. Recently, as the input devices, many input devices including a touch sensing device have been used.

A touch sensing function is to determine contact information such as whether an object approaches or contacts a screen, a contact position thereof, and the like by sensing a change in pressure, charges, light, and the like which are applied onto the screen by the display device, when a user writes a text or draws a figure by approaching or contacting the screen with a finger or a touch pen. The display device may receive an image signal based on the contact information to display an image.

The touch sensing function may be implemented by a touch sensor. The sensor may be classified according to various types such as a resistive type, a capacitive type, an electro-magnetic resonance (EMR) type, and an optical type.

In the case of the resistive type touch sensor, two electrodes which face each other to be spaced apart from each other may contact each other by pressure due to an external object. When two electrodes contact each other, a change in voltage according to a resistance change at the contact position is recognized to determine the contact position and the like.

The capacitive type touch sensor includes a sensing capacitor configured by a sensing electrode which may transfer the sensing signal, and may determine whether there is a contact, a contact position, and the like by sensing a change in capacitance of the sensing capacitor generated when a conductor such as a finger approaches the sensor. The capacitive type touch sensor may sense the touch only when a user contacts a touch panel and requires a contact by a conductive object.

The touch panel may be included in a flexible electronic device which has been recently developed. However, due to a flexible characteristic of the flexible electronic device, it has been required that an electrode of the touch panel has also flexibility so as to prevent a defect from being generated.

SUMMARY OF CERTAIN INVENTIVE ASPECTS

One inventive aspect relates to a touch panel including a capacitive type touch sensor.

Another aspect is a touch panel having advantages of improving visibility, even though a touch panel having conductive patterns including silver nano wires is formed.

Another aspect is a touch panel including: a substrate; a photosensitive lower layer formed on the substrate; a plurality of touch electrodes and connecting lines formed on the photosensitive lower layer positioned in a touch area of the substrate; a pad positioned outside the touch area of the substrate and connected to one end of the connecting line; and a photosensitive upper layer positioned on the touch electrode and the connecting line.

The photosensitive lower layer may be exposed between the adjacent touch electrodes or between the adjacent connecting lines, the substrate may be exposed between the adjacent pads, and the photosensitive upper layer may contact the exposed photosensitive lower layer.

The touch electrode, the connecting line, and the pad may include a conductive layer made of a plurality of metal nano wires.

The pad may further include an auxiliary pad formed on the conductive layer.

The auxiliary pad may be made of silver or copper.

The metal nano wire of the conductive layer may be embedded in a photosensitive material which is integrated with the photosensitive lower layer.

The touch electrodes may be arranged in a matrix, and the connecting lines may be positioned between the touch electrodes.

A size of the touch electrode may be decreased as the touch electrode is adjacent to the pad.

The photosensitive lower layer and the photosensitive upper layer may have the same refractive index.

The refractive index may be 1.46.

The touch electrode, the connecting line, and the pad may have a thickness of 8,000 Å.

The thicknesses of the photosensitive lower layer and the photosensitive upper layer may be the same as each other.

The metal nano wire may be silver.

The photosensitive lower layer and the pad positioned in the peripheral area may have the same planar shape.

Another aspect is a method for manufacturing a touch panel including: transferring a first photosensitive film having an embedded layer embedded with a plurality of metal nano wires on a substrate; patterning the first photosensitive film by using a first mask; removing a release paper of the first photosensitive film; curing the first photosensitive film by using a second mask; forming a touch electrode, a connecting line, and a pad by developing the first photosensitive film; and transferring a second photosensitive film onto the touch electrode and the connecting line.

The patterning process and the curing process may include exposing processes with different energy.

Exposure energy in the curing process may be greater than exposure energy in the patterning process.

In the patterning process, the exposure may be performed only in the embedded layer.

The first mask may include a transmitting portion corresponding to the touch electrode, the connecting line, and the pad, and a light blocking portion positioned between the transmitting portions, and the second mask may include a transmitting portion corresponding to a touch area in which the touch electrode and the connecting line are positioned, and a light blocking portion corresponding to the first photosensitive film between the pads.

Another aspect is a touch panel, comprising: a substrate including a touch area and a peripheral area; a photosensitive lower layer formed over the substrate; a plurality of touch electrodes and a plurality of connecting lines formed over the photosensitive lower layer positioned in the touch area of the substrate; a plurality of pads formed over the photosensitive lower layer positioned in the peripheral area of the substrate and connected to the connecting lines; and a photosensitive upper layer positioned over the touch electrodes and the connecting lines.

In the above touch panel, the photosensitive lower layer is exposed between neighboring touch electrodes or between neighboring connecting lines, wherein the substrate is exposed between the neighboring pads, and wherein the photosensitive upper layer contacts the exposed photosensitive lower layer.

In the above touch panel, each of the touch electrodes, the connecting lines, and the pads includes a conductive layer formed of a plurality of metal nano wires.

In the above touch panel, each of the pads further includes an auxiliary pad formed over the conductive layer.

In the above touch panel, the auxiliary pad is formed of silver or copper.

In the above touch panel, the metal nano wires of the conductive layer are embedded in a photosensitive material which is integrated with the photosensitive lower layer.

In the above touch panel, each of the metal nano wires is formed of silver.

In the above touch panel, the touch electrodes are arranged in a matrix, wherein the connecting lines are positioned between the touch electrodes.

In the above touch panel, the size of each of the touch electrodes decreases as the touch electrode is closer to the pad.

In the above touch panel, the photosensitive lower layer and the photosensitive upper layer have the same refractive index.

In the above touch panel, the refractive index is about 1.46.

In the above touch panel, each of the touch electrodes, the connecting lines, and the pads has a thickness of about 8,000 Å.

In the above touch panel, the thicknesses of the photosensitive lower layer and the photosensitive upper layer are the same.

In the above touch panel, the photosensitive lower layer and the pads positioned in the peripheral area have the same planar shape.

Another aspect is a method for manufacturing a touch panel, comprising: transferring a first photosensitive film, containing an embedded layer formed of a plurality of metal nano wires, over a substrate; patterning the first photosensitive film via a first mask; removing a release paper of the first photosensitive film; curing the first photosensitive film via a second mask; developing the first photosensitive film so as to form a plurality of touch electrodes, a plurality of connecting lines, and a plurality of pads; and transferring a second photosensitive film onto the touch electrodes and the connecting lines.

In the above method, each of the patterning and the curing includes exposing the first photosensitive film with different levels of applied energy.

In the above method, the curing has a higher level of applied energy than the patterning.

In the above method, the exposing in the patterning is performed only in the embedded layer.

In the above method, the first mask includes a transmitting portion corresponding to the touch electrodes, the connecting lines, and the pads, and a light blocking portion positioned between the transmitting portion, wherein the second mask includes a transmitting portion corresponding to a touch area in which the touch electrodes and the connecting lines are positioned, and wherein a light blocking portion corresponding to the first photosensitive film between neighboring pads.

Another aspect is a touch panel, comprising: a substrate; a first photosensitive layer formed over the substrate, wherein the first photosensitive layer is formed of a metal nano wire; a plurality of touch electrodes and a plurality of connecting lines formed over the first photosensitive layer; and a second photosensitive layer positioned over the touch electrodes and the connecting lines.

DETAILED DESCRIPTION OF CERTAIN INVENTIVE EMBODIMENTS

Figure 1:
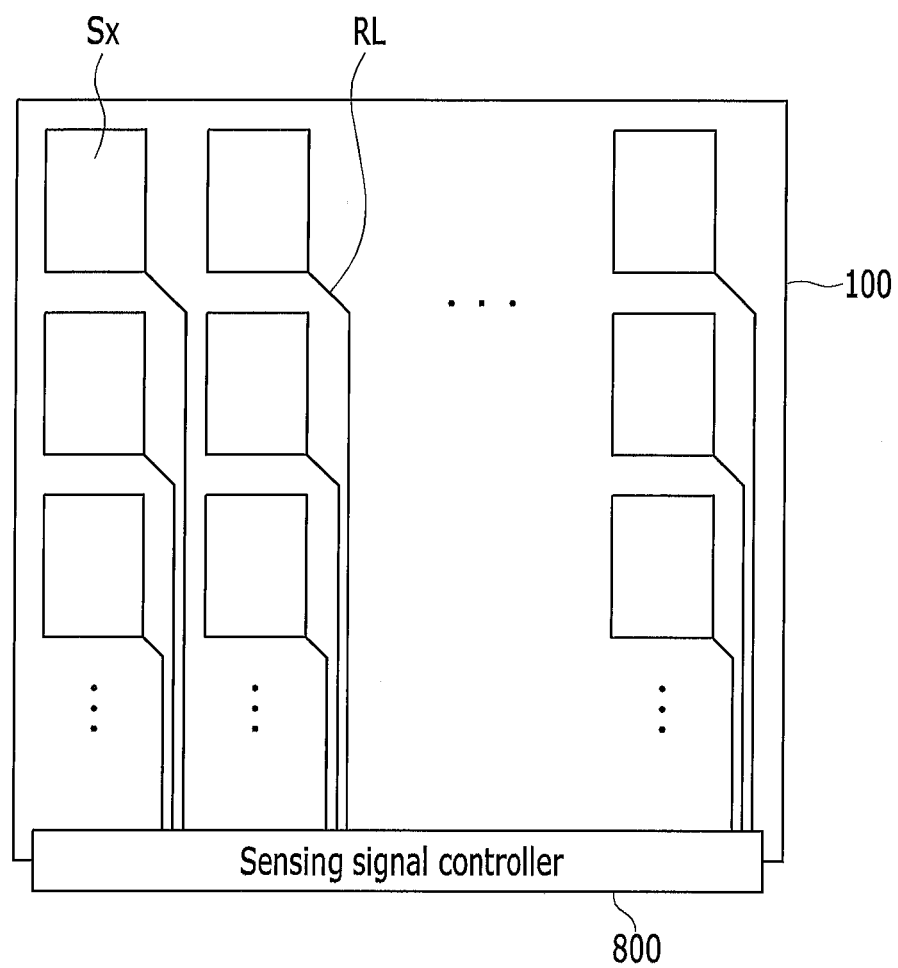
FIG. 1 is a schematic plan view of a touch panel according to an exemplary embodiment of the present disclosure.

Some touch panels use a material for the electrode that has flexibility, for example, silver nano wire (AgNW). However, conductive patterns formed by using silver nano wire result in steps between each conductor due to varying thicknesses of the conductive patterns. This can result in the steps being seen and causing a distraction to those viewing images presented on an underlying display panel.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

It will be understood that when an element such as a layer, film, region, or substrate is referred to as being "on" another element, it can be directly on the other element or intervening elements may also be present. Further, in the specification, the word "on" means positioning on or below the object portion, but does not essentially mean positioning on the upper side of the object portion based on a gravity direction.

In addition, the size and thickness of each configuration shown in the drawings may be arbitrarily shown for understanding and ease of description, but the present disclosure is not limited thereto.

Hereinafter, a touch panel according to an exemplary embodiment of the present disclosure will be described in detail with reference to the accompanying drawings. In this disclosure, the term "substantially" includes the meanings of completely, almost completely or to any significant degree under some applications and in accordance with those skilled in the art. The term "connected" includes an electrical connection.

FIG. 1 is a schematic plan view of a touch panel according to an exemplary embodiment of the present disclosure.

As illustrated in FIG. 1, the touch panel includes a touch sensor and a sensing signal controller 800 connected to the touch sensor.

The touch sensor may be various types of touch sensors, but in the exemplary embodiment, a capacitive type touch sensor will be described as an example.

The touch sensor may sense a touch included in a display panel or a separate touch panel. In the exemplary embodiment, an example in which the touch sensor is included in the touch panel will be mainly described. Here, the touch includes cases where an external object directly contacts and approaches the display panel or the touch panel.

The touch sensor can include a plurality of touch electrodes Sx positioned in an active area of a substrate 100 and a plurality of connecting lines RL connected to the touch electrodes Sx. The active area is an area in which the touch may be applied and sensed, and for example, in the case of a display panel, the active area may overlap the display area in which the image is displayed. In the case of the touch panel, the active area may be a touch area, and when the touch panel is installed in the display panel, the touch area may overlap the display area. Hereinafter, the active area is also referred to as a touch area.

The touch electrodes Sx may be arranged in a matrix form and formed on the same layer as each other when viewed from a cross-sectional structure. The touch electrode Sx may include metal nanowire, for example, silver (Ag) nano wire.

A shape of the touch electrode Sx may be a quadrangle as illustrated in FIG. 1, but is not limited thereto and may have various shapes. The touch electrode Sx may include a plurality of protrusions and depressions (not illustrated) formed at an edge side in order to enhance touch sensitivity. When the edge side of the touch electrode Sx includes the protrusions and depressions, uneven edge sides of the adjacent touch electrodes Sx may engage with each other.

A length of one side of the touch electrode Sx may be about several mm, for example, about 10 mm or less, for example, about, 4 mm to about 5 mm, but a size of the touch electrode Sx may be appropriately controlled according to a touch sensing resolution.

The touch electrodes Sx are separated from each other in the touch area, and different touch electrodes Sx may be connected to the sensing signal controller 800 through different connecting lines RL.

The touch electrode Sx receives a sensing input signal from the sensing signal controller 800 through each connecting line RL and generates a sensing output signal according to a contact to transmit the generated sensing output signal to the sensing signal controller 800. Each touch electrode Sx forms a self-sensing capacitor to receive the sensing input signal and then may be charged at a predetermined charge amount.

Thereafter, when an external object such as a finger is touched, the charge amount of the self-sensing capacitor is changed and thus a sensing output signal different from the input sensing input signal may be output. As such, contact information such as whether the contact exists and a contact position may be determined through the changed sensing output signal.

The connecting line RL connects the touch electrode Sx and the sensing signal controller 800 to transfer the sensing input signal or the sensing output signal. The connecting line RL may be positioned on the same layer as the touch electrode Sx and formed of the same material as the touch electrode Sx. However, the present disclosure is not limited thereto, and the connecting line RL is positioned on a different layer from the touch electrode Sx and may be connected to the touch electrode Sx through a separate connection part.

In the exemplary embodiment illustrated in FIG. 1, the number of connecting lines RL formed between touch electrode Sx columns increases toward the sensing signal controller 800. Accordingly, the size of the touch electrode Sx may decrease toward the sensing signal controller 800.

The width of the connecting line RL may be about 10 μm or more and about 100 μm or less, but is not limited thereto. Accordingly, the connection portion of the touch electrode Sx and the connecting line RL form a bottle neck portion of which a width rapidly increases or decreases.

The sensing signal controller 800 is connected to the touch electrode Sx of the touch panel to transfer the sensing input signal and receive the sensing output signal to and from the touch electrode. The sensing signal controller 800 processes the sensing output signal to generate contact information such as whether a contact exists and a contact position.

The sensing signal controller 800 may be positioned on a separate printed circuit board from the substrate 100 of the touch panel to be connected to the touch panel, attached on the substrate 100 of the touch panel in an IC chip form or a TCP form, or integrated on the substrate 100.

Hereinafter, an interlayer configuration of the touch panel according to the exemplary embodiment of the present disclosure will be described in more detail.

Figure 2:
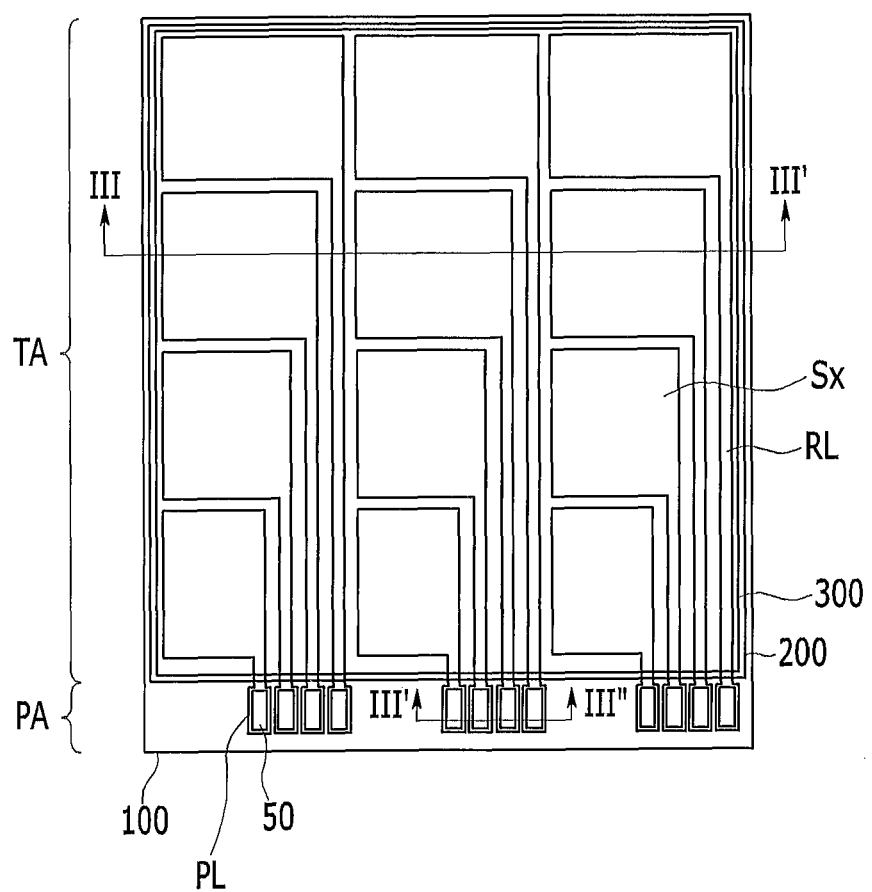
FIG. 2 is a layout view of touch electrodes according to the exemplary embodiment of the present disclosure.
Figure 3:
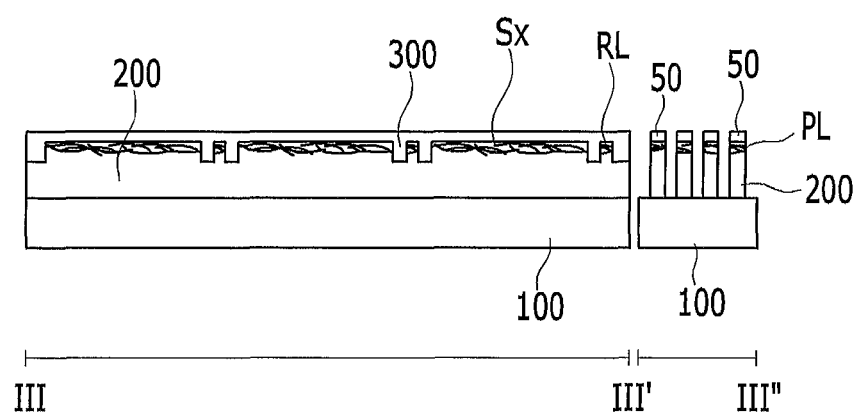
FIG. 3 is a cross-sectional view taken along line III-III' and III'-III' of FIG. 2.

FIG. 2 is a layout view of touch electrodes according to the exemplary embodiment of the present disclosure, and FIG. 3 is a cross-sectional view taken along line III-III' and III'-III" of FIG. 2.

As illustrated in FIGS. 2 and 3, the touch panel according to the exemplary embodiment of the present disclosure includes a substrate 100, and a plurality of touch electrodes Sx formed on the substrate 100 and in a matrix form.

Referring to FIG. 2, the touch electrodes Sx are formed in one direction at regular intervals. Each touch electrode Sx may be connected to a pad PL through the connecting line RL. The connecting line RL may input an input signal to the touch electrode Sx or output an output signal to the sensing signal controller through the pad PL.

Most of the connecting lines RL are positioned in the touch area TA where the touch electrodes Sx are formed, and connected to the pads PL positioned in a peripheral area PA outside the touch area TA, respectively. That is, the connecting line RL is connected to one side of the touch electrode Sx facing the pad PL and positioned between two adjacent touch electrodes Sx.

As such, when the connecting line RL is positioned between the touch electrodes Sx, the width of the peripheral area PA without the pad PL may be further reduced.

As the touch electrode Sx is adjacent to the pad PL, an area of the touch electrode Sx may decrease. This is because the connecting line RL is linearly connected to the pad PL without bending from one side of the touch electrode Sx, and the width of the touch electrode Sx decreases by the width of the connecting line RL and a distance between the connecting lines.

In FIG. 2, touch electrodes having three columns and four rows are illustrated, but are not limited thereto and if necessary, the touch electrodes may be arranged in a more number of rows and columns.

The touch electrodes Sx receive the sensing input signal through the connecting line RL and then are charged at a predetermined charge amount. Thereafter, when an external object such as a finger touches the display panel, the charge amount of the self-sensing capacitor is changed and thus a sensing output signal different from the input sensing input signal may be output. As such, touch information such as whether the touch exists and a touch position may be determined through the change in the sensing output signal.

Referring to FIGS. 2 and 3, a photosensitive lower layer 200 is formed on the substrate 100, a plurality of touch electrodes Sx, a connecting line RL connected to each of the touch electrodes Sx, and a pad PL connected to one end of the connecting line RL are formed on the photosensitive lower layer 200, and a photosensitive upper layer 300 is formed on the touch electrode Sx and the connecting line RL.

The substrate 100 may be formed of plastic such as polycarbonate, polyimide, and polyether sulfone, glass, or the like. The substrate 100 may be a transparent flexible substrate having flexibility such as foldable, bendable, rollable, and elasticity such as stretchable in at least one direction.

The touch electrode Sx, the connecting line RL, and the pad PL include a conductive layer including a plurality of metal nano wires. The metal nano wires form a network to have conductivity, and the metal nano wire may be silver nano wire.

The touch electrode Sx, the connecting line RL, and the pad PL can be formed with a thickness of about 8,000 Å.

The touch electrode Sx, the connecting line RL, and the pad PL may be an embedded layer which is embedded in the photosensitive lower layer 200 integrally with the photosensitive lower layer 200.

The photosensitive upper layer 300 can be formed in only the touch area TA and may contact the photosensitive lower layer 200 exposed between the touch electrode Sx and the connecting line RL. The photosensitive lower layer and the photosensitive upper layer can be formed of a material having the same refractive index with the same thickness. In some embodiments, the photosensitive lower layer 200 and the photosensitive upper layer 300 have a thickness of about 5 μm or less and a refractive index of about 1.46 nm.

An auxiliary pad 50 is formed on the pad PL and may be formed of copper or silver.

Hereinafter, a method for manufacturing the touch panel according to the exemplary embodiment of the present disclosure will be described in more detail with reference to the accompanying drawings.

Figure 4:
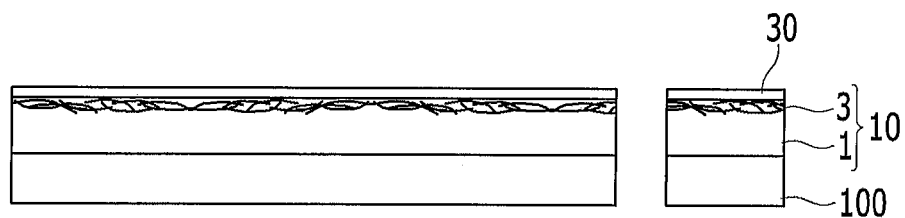
FIGS. 4, 5, and 6 are cross-sectional views for describing a method for manufacturing a touch panel according to an exemplary embodiment of the present disclosure.
Figure 5:
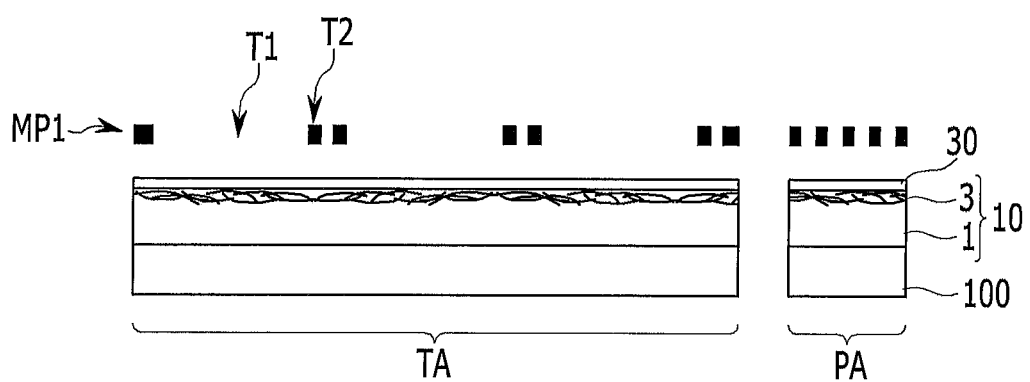
Figure 6:
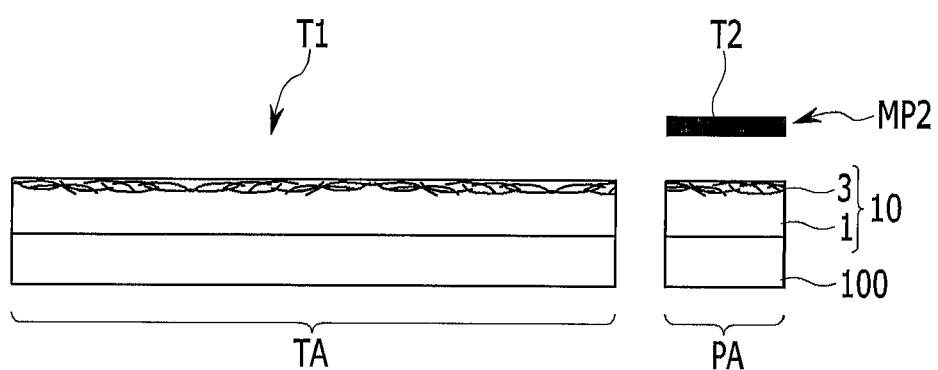
Figure 7:
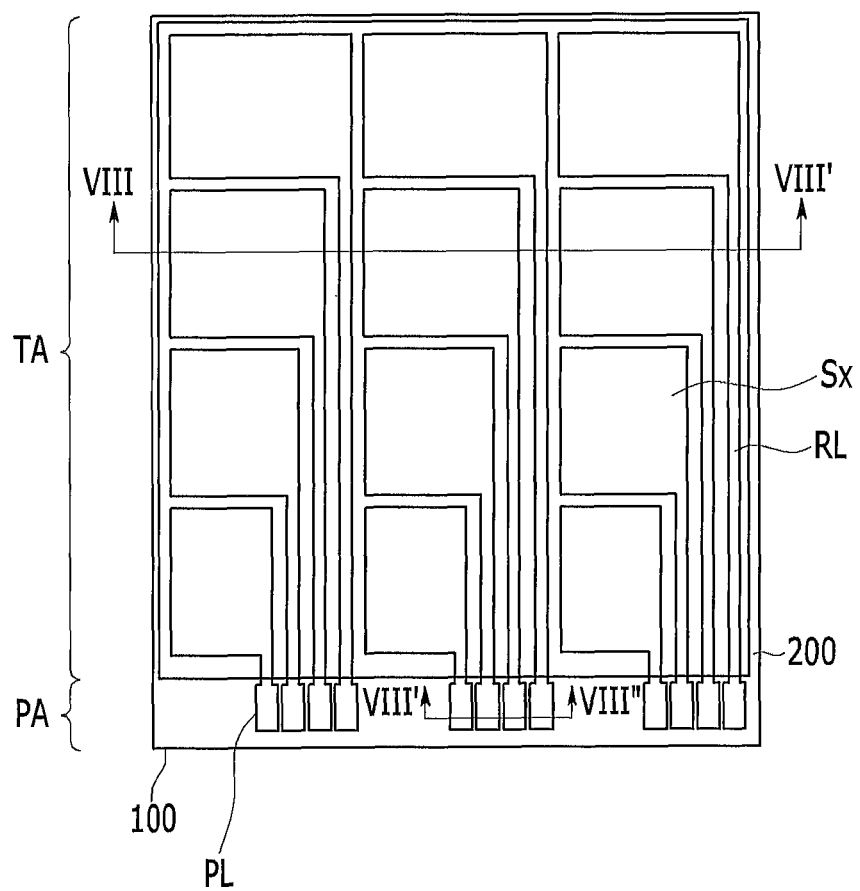
FIG. 7 is a layout view for describing the method for manufacturing the touch panel in a next step of FIG. 6.
Figure 8:
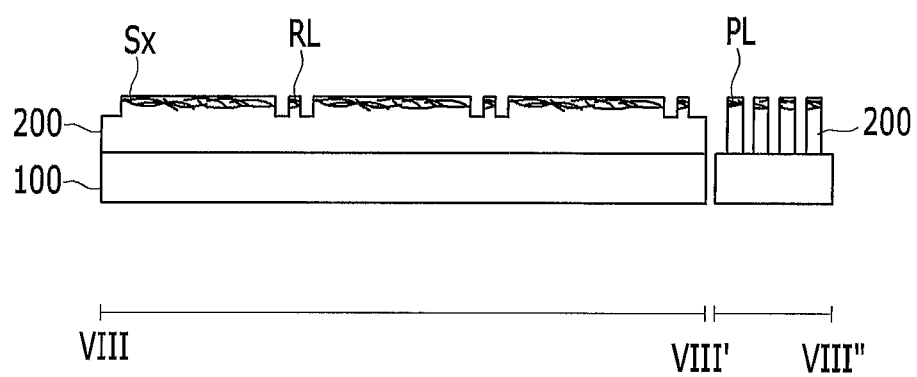
FIG. 8 is a cross-sectional view taken along line VIII-VIII' and VIII'-VIII" of FIG. 7.

FIGS. 4, 5 and 6 are cross-sectional views for describing a method for manufacturing a touch panel according to an exemplary embodiment of the present disclosure, FIG. 7 is a layout view for describing the method for manufacturing the touch panel in a next step of FIG. 6, and FIG. 8 is a cross-sectional view taken along line VIII-VIII' and VIII'-VIII" of FIG. 7.

As illustrated in FIG. 4, a first photosensitive film 10 is transferred onto the substrate 100. In the first photosensitive film, a release paper 30 is attached onto a surface which is not attached to the substrate.

In some embodiments, the first photosensitive film 10 includes a photosensitive material layer 1 and a conductive layer 3 including silver nano wire positioned on the photosensitive material layer 1.

In FIG. 4, the conductive layer 3 is an embedded layer formed by embedding a plurality of silver nano wires on the photosensitive material layer 1 as an integrated type with the photosensitive material layer 1, but the conductive layer 3 may be separately formed on the photosensitive material layer 1.

Next, as illustrated in FIG. 5, the first photosensitive film is patterned by performing an exposure process on the first photosensitive film 10 by using a first mask MP1. In this case, the patterning means that an exposure pattern divided into an exposure region and a non-exposure region is formed on the first photosensitive film.

The first mask MP1 has a transmitting portion T1 positioned in a region corresponding to a pattern to be formed, that is, the touch electrode, the connecting line, and the pad and a light blocking portion T2 positioned between the transmitting portions T1.

An exposure amount irradiated to the first photosensitive film 10 is irradiated with energy of about several mJ to dozens mJ so as to be irradiated to only the conductive layer 3 including silver nano wire.

Next, as illustrated in FIG. 6, the release paper positioned on the first photosensitive film 10 is removed, and then the first photosensitive film 10 is cured by performing the exposure process on the first photosensitive film 10 by using a second mask MP2.

The second mask MP2 has a transmitting portion T1 corresponding to the touch area TA in which the touch electrode and the connecting line are positioned and a light blocking portion T2 corresponding to the peripheral area PA.

The exposure amount irradiated to the first photosensitive film 10 through the second mask MP2 is irradiated with more exposure energy than that of FIG. 5 so that the entire thickness of the first photosensitive film 10 may be exposed. In this case, the exposure energy may be dozens mJ to hundreds mJ.

Meanwhile, in FIG. 6, since the exposure process is performed while the release paper is removed, the exposed region of the first photosensitive film 10 may be oxidized and cured by reacting with oxygen by light energy.

Next, as illustrated in FIGS. 7 and 8, the photosensitive lower layer 200 and touch electrode Sx, the connecting line RL, and the pad PL positioned on the photosensitive lower layer 200 are formed by developing the first photosensitive film 10.

The process of developing the first photosensitive film 10 may be performed with an alkali-based solution such as TMAH, $Na_2CO_3$, and KOH.

When the developing process is performed, in the touch area TA, since the non-exposed region of the conductive layer is removed during the patterning process and the entire touch area TA is exposed and cured in the curing process, the photosensitive lower layer 200 remains in the entire touch area TA, and the touch electrode Sx and the connecting line RL made of silver nano wire remain on the photosensitive lower layer 200.

In addition, even in the peripheral area PA, the non-exposed region is removed, and in the peripheral area PA, since the non-exposed region of the conductive layer in the patterning process and the non-exposed region in the curing process overlap with each other, the first photosensitive film 10 corresponding to the non-exposed region in the patterning process is fully removed.

Accordingly, the photosensitive lower layer 200 positioned in the peripheral area PA has the same planar shape as the pad PL.

Next, as illustrated in FIGS. 2 and 3, the photosensitive upper layer 300 protecting the touch electrode Sx and the connecting line RL is formed by transferring the second photosensitive film onto the entire touch area TA.

In this case, since the pad PL of the peripheral area PA needs to apply an external signal, the photosensitive upper layer 300 is formed only in the touch area TA.

The photosensitive upper layer 300 may have the same refractive index as a photosensitive material of the first photosensitive film. The photosensitive upper layer 300 may protect sides of the touch electrode Sx and the connecting line RL by contacting the photosensitive lower layer 200 exposed in the touch area TA.

Thereafter, the auxiliary pad 50 is formed on the pad PL. The auxiliary pad 50 may be formed by forming and patterning a metal layer such as copper or formed only on the pad PL with silver paste.

Like the present disclosure, when the auxiliary pad 50 is formed after forming the photosensitive upper layer 300, the touch electrode, the connecting line, and the like are not exposed in the process of forming the auxiliary pad to prevent the touch electrode, the connecting line, and the like from being damaged.

According to at least one of the disclosed embodiments, the touch electrode and the connecting line are formed by using the first photosensitive film including metal nano wire and covered and protected by the second photosensitive film, and as a result, even in repeated bending operations of the touch panel, reliability may be improved.

Further, since the peripheral area and the touch area have a step by the thickness of the second photosensitive film, a pad and a bump of a driving circuit may be easily arranged by using a step in a compression process for attaching the driving circuit and the like to the pad of the peripheral area.

Further, the step generated due to the thickness of the touch electrode and the connecting line may be visible, but in the exemplary embodiment of the present disclosure, the second photosensitive film is filled between the touch electrode and the connecting line, thereby removing the step generated due to the thickness of the touch electrode and the connecting line. Accordingly, visibility of the touch panel according to the exemplary embodiment of the present disclosure may improve.

While the inventive technology has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A touch panel, comprising:
    a substrate including a touch area and a peripheral area;
    a photosensitive lower layer formed over a first surface of the substrate;
    a plurality of touch electrodes and a plurality of connecting lines formed over the photosensitive lower layer positioned in the touch area of the substrate;
    a plurality of pads formed over the photosensitive lower layer positioned in the peripheral area of the substrate and connected to the connecting lines; and
    a photosensitive upper layer positioned over the touch electrodes and the connecting lines on the first surface of the substrate,
    wherein the photosensitive lower layer is exposed between neighboring touch electrodes and connecting lines, wherein the substrate is exposed between the neighboring pads, and wherein the photosensitive upper layer contacts the exposed photosensitive lower layer.

2. The touch panel of claim 1, wherein each of the touch electrodes, the connecting lines, and the pads includes a conductive layer formed of a plurality of metal nano wires.

3. The touch panel of claim 2, wherein each of the pads further includes an auxiliary pad formed over the conductive layer.

4. The touch panel of claim 3, wherein the auxiliary pad is formed of silver or copper.

5. The touch panel of claim 2, wherein the metal nano wires of the conductive layer are embedded in a photosensitive material which is integrated with the photosensitive lower layer.

6. The touch panel of claim 2, wherein each of the metal nano wires is formed of silver.

7. The touch panel of claim 1, wherein the touch electrodes are arranged in a matrix, and wherein the connecting lines are positioned between the touch electrodes.

8. The touch panel of claim 7, wherein the size of each of the touch electrodes decreases as the touch electrode is closer to the pad.

9. The touch panel of claim 1, wherein the photosensitive lower layer and the photosensitive upper layer have the same refractive index.

10. The touch panel of claim 9, wherein the refractive index is about 1.46.

11. The touch panel of claim 1, wherein each of the touch electrodes, the connecting lines, and the pads has a thickness of about 8,000 Å.

12. The touch panel of claim 1, wherein the thicknesses of the photosensitive lower layer and the photosensitive upper layer are the same.

13. The touch panel of claim 1, wherein the photosensitive lower layer and the pads positioned in the peripheral area have the same planar shape.

14. A method for manufacturing a touch panel, comprising:
    transferring a first photosensitive film, containing an embedded layer formed of a plurality of metal nano wires, over a first surface of a substrate;
    patterning the first photosensitive film via a first mask;
    removing a release paper of the first photosensitive film;
    curing the first photosensitive film via a second mask;
    developing the first photosensitive film so as to form a plurality of touch electrodes, a plurality of connecting lines, and a plurality of pads; and
    transferring a second photosensitive film onto the touch electrodes and the connecting lines on the first surface of the substrate,
    wherein the first photosensitive film is exposed between neighboring touch electrodes and connecting lines, wherein the substrate is exposed between the neighboring pads, and wherein the second photosensitive film contacts the exposed first photosensitive film.

15. The method of claim 14, wherein each of the patterning and the curing includes exposing the first photosensitive film with different levels of applied energy.

16. The method of claim 15, wherein the curing has a higher level of applied energy than the patterning.

17. The method of claim 15, wherein the exposing in the patterning is performed only in the embedded layer.

18. The method of claim 15, wherein the first mask includes a transmitting portion corresponding to the touch electrodes, the connecting lines, and the pads, and a light blocking portion positioned between the transmitting portion, and wherein the second mask includes a transmitting portion corresponding to a touch area in which the touch electrodes and the connecting lines are positioned, and wherein a light blocking portion corresponding to the first photosensitive film between neighboring pads.

19. A touch panel, comprising:
a substrate;
a first photosensitive layer formed over a first surface of the substrate, wherein the first photosensitive layer is formed of a metal nano wire;
a plurality of touch electrodes and a plurality of connecting lines formed over the first photosensitive layer;
a plurality of pads formed over the first photosensitive lower layer; and
a second photosensitive layer positioned over the touch electrodes and the connecting lines on the first surface of the substrate,
wherein the first photosensitive layer is exposed between neighboring touch electrodes and connecting lines, wherein the substrate is exposed between the neighboring pads, and wherein the second photosensitive layer contacts the exposed first photosensitive layer.

* * * * *